June 12, 1951 V. MILITANO 2,556,206
COMBINED CLAMP AND ADJUSTABLE ROD HOLDER
Filed Aug. 27, 1949
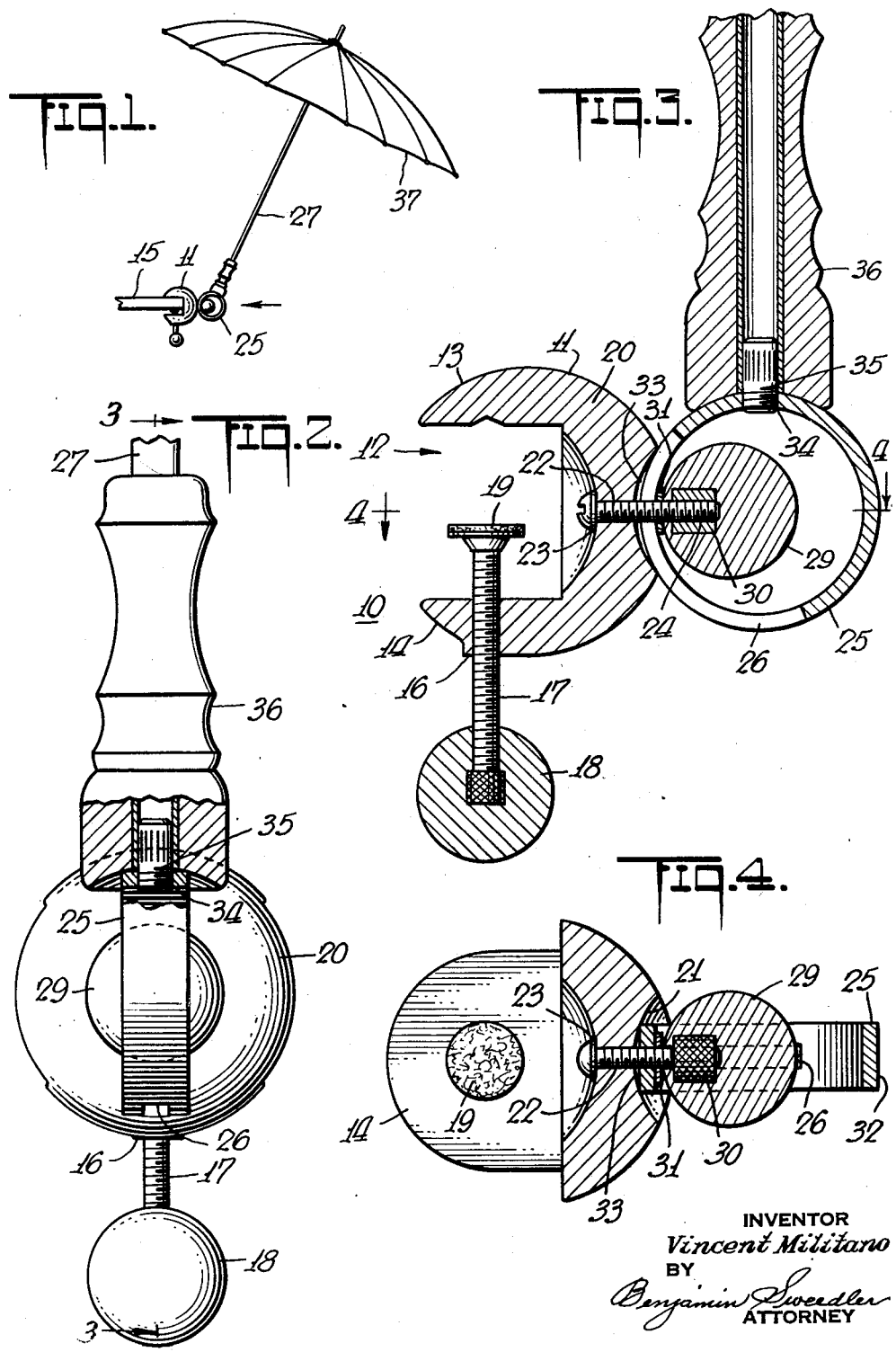
INVENTOR
*Vincent Militano*
BY
*Benjamin Sweedler*
ATTORNEY Patented June 12, 1951

2,556,206

UNITED STATES PATENT OFFICE 2,556,206

COMBINED CLAMP AND ADJUSTABLE ROD HOLDER

Vincent Militano, Hicksville, N. Y., assignor to Finkel Umbrella Frame Company, Inc., New York, N. Y., a corporation of New York Application August 27, 1949, Serial No. 112,721

3 Claims. (Cl. 248—41)

1

This invention relates to an adjustable rod holder adapted among other uses to be employed for holding an umbrella or parasol in any desired adjusted position on the arm of a chair or other such support.

It is among the objects of this invention to provide a rod holder which is simple in construction, efficient in operation, requires relatively few parts, can be manufactured at relatively low cost, is capable of universal adjustment and which adjustment can be effected quickly and with little effort.

Other objects and advantages of this invention will be apparent from the following detailed description thereof.

In the preferred embodiment illustrated on the drawing the invention is shown incorporated in an adjustable clamp and holder for an umbrella, and the present description will be confined to the present illustrated embodiment of the invention. It will be understood, however, that the novel features and improvements are susceptible to other applications, and, hence, the scope of this invention is not confined to the embodiment herein described.

In the accompanying drawing forming a part of this specification and showing for purposes of exemplification a preferred form of this invention without limiting the invention to such illustrative instance, Figure 1 is a diagrammatic view showing the rod holder of this invention supporting an umbrella in inclined position on a support, such as the arm of a chair, which arm is fragmentarily shown;

Figure 2 is an elevational view, partly in section, of the adjustable rod holder of this invention looking at same in the direction indicated by the arrow on Figure 1;

Figure 3 is a vertical section taken in a plane passing through line 3—3 on Figure 2; and Figure 4 is a horizontal section taken in a plane passing through line 4—4 on Figure 3.

In the drawing 10 indicates a clamping device in the form of a sphere or ball 11 having a cutaway portion 12 providing legs 13 and 14 for engaging a supporting surface 15, such as the arm of a chair to which the clamp may be fastened. Lower leg 14 is provided with a threaded boss 16. A threaded rod or bolt 17 is in threaded engagement with this boss. A clamp-ball 18 is suitably secured to the lower end of rod 17 and the upper end is provided with a floating button or thumb-piece 19 for engagement with one side of support 15. By turning clamp-ball 18 in one

2 direction the rod 17 is moved to securely fasten clamp 10 to surface 15. When the clamp-ball 18 is turned in the opposite direction, thumb-piece 19 is moved out of engagement with the surface 15 permitting the ready removal of the clamp from this surface.

Clamp 10, it will be noted, comprises a U or yoke shaped member consisting of legs 13 and 14 and a connecting portion 20 having a convex outer surface provided with a concavity 21 disposed with its center on the horizontal axis of the ball 11. Centrally positioned with respect to the concavity 21 and ball 11 and passing through the connecting portion 20 is a threaded bolt or rod 22. A lock washer 23 is interposed between the head of this bolt 22 and the inner surface of the connecting portion 20. This rod 22 is fixed to the connecting portion 20 so that it cannot move relative thereto, and has free end 24 thereof projecting beyond the outer periphery of the connecting portion 20.

A cylindrical sleeve or ring 25 of a width less than the diameter of the concavity 21 is provided with a slot 26. This slot is disposed substantially midway between the marginal edges of sleeve 25 and desirably extends a distance somewhat less than one-half the circumferential periphery of the sleeve. Preferably slot 26 is of a length to permit 90° travel of the umbrella rod 27. Slot 26, however, may be of any desired length depending upon the desired extent of angular adjustment of the umbrella rod 27 in a direction toward or away from the supporting surface 15 viewing Figure 1. Slot 26 is of a width to permit the passage of bolt 22 therethrough leaving a small clearance between the bolt and the walls defining the slot, so that the sleeve 25 can readily be turned about its center as an axis to the extent permitted by the length of the slot 26 and also be turned about bolt 22 as an axis. Thus, sleeve 25 is universally adjustable relative to clamp 10.

A ball 29 having a threaded nut 30 inserted in the periphery thereof and fastened thereto is disposed to have this nut 30 in threaded engagement with the projecting end 24 of bolt 22. A flat circular washer 31 is interposed between ball 29 and the sleeve 25. When ball 29 is in position to exert no clamping action on sleeve 25 through washer 31, the sleeve can be rotated 360° about bolt 22 as the axis of rotation, the aforementioned clearance between bolt 22 and the sides of slot 26 permitting such rotation to take place. Once the sleeve is adjusted to the desired position, ball 29 is moved to clamp it in place between the washer 31 and the inner wall of the concavity 21. An exceptionally firm clamp results due to the fact that the sleeve 25 is of cylindrical shape, the periphery thereof being perfectly straight, as indicated by the reference character 32 in Figure 4. A small clearance 33 is thus left between the sleeve 25 and the inner wall of concavity 21, as shown in Figures 3 and 4, when the sleeve is in clamped adjusted position. Accordingly, the edges of the sleeve are in contact with the inner wall of the concavity throughout the length of the portion of the sleeve in contact with this concavity. Hence, there is produced what might well be termed a knife edge contact between the sleeve 25 and the concavity 21 resulting in an exceptionally firm clamp between these members under the influence of the stress exerted by the ball 29.

Sleeve 25 is provided with a threaded opening 34 into which may be threaded the protruding end of a bolt 35 suitably secured to a handle 36 on one end of rod 27 carrying umbrella 37. Desirably, the base of handle 36 is of concave shape to snugly engage the periphery of sleeve 25. With this construction the umbrella may be disengaged from the sleeve 25 by simply turning handle 36 to remove bolt 35 from the opening 34 and the umbrella carried for use as a golf umbrella or other purposes, leaving the clamp 10 secured to the supporting surface 15 for later replacement of the umbrella on the adjustable clamp when the user desires so to do.

The parts hereinabove described may be of any suitable materials of construction. For example, ball 11 desirably is of cast aluminum, or other relatively light weight metal or metal alloy. Balls 29 and 18 desirably are of wood or plastic, sleeve 25 of spring steel or other suitable material, and the bolts 17 and 22 of steel or other suitable metal. The inner surface of leg 13 and the top of thumbpiece 19 may be lined with felt to avoid marring the surface to which the clamp may be secured.

The operation of the adjustable rod holder should be evident from the above description of the construction thereof. Suffice it to say that by loosening ball 29, so that the washer 31 does not exert any clamping action on the sleeve 25, this sleeve may be partially rotated about its center as an axis, bolt 22 riding in slot 26 of the sleeve to move the umbrella to a vertical position or to any desired inclined position toward or away from support 15. Sleeve 25 may also be moved 360° about bolt 22 as an axis. Once moved into desired position ball 29 is tightened to firmly clamp sleeve 25 in place as hereinabove described. Thus, it will be noted, the rod holder of this invention is simple in construction, efficient in operation, requires relatively few parts, can be manufactured at relatively low cost, is capable of universal adjustment, and such adjustment can be effected quickly and with little effort.

Since certain changes may be made in the above described rod holder and different embodiments of the invention could be made without departing from the scope thereof, it is intended that all matter contained in the above description or shown in the accompanying drawing shall be interpreted as illustrative and not in a limiting sense.

What is claimed is:

1. A combined clamp and rod holder comprising a yoke shaped clamp having a convex connecting portion provided with spaced legs, means on one of said legs for securing said clamp to a supporting surface, said connecting portion having a concavity in the periphery thereof, a member carried by said connecting portion and projecting from said concavity, a ring on said member mounted for rotation about said member as an axis, mean on the projecting portion of said member for clamping said ring to said connecting portion, and means on said ring for supporting a rod.

2. A combined clamp and rod holder comprising a yoke shaped clamp having a convex connecting portion provided with spaced legs, means on one of said legs for securing said clamp to a supporting surface, said connecting portion being provided with a concavity in the periphery thereof, a bolt carried by said connecting portion extending through said concavity and projecting beyond the periphery of said connecting portion, a ring provided with a slot, said bolt passing through said slot, means on the projecting portion of said bolt for engaging said ring to clamp it to said connecting portion, and means on said ring for supporting a rod.

3. A combined clamp and rod holder comprising a yoke shaped clamp consisting of a convex connecting portion provided with spaced legs, one of said legs having a threaded opening, a threaded rod in threaded engagement with said opening and having one end extending between said legs provided with a thumb-piece, a ball on the opposite end of said threaded rod for operation of said threaded rod to cause said thumb-piece to engage a supporting surface, said convex connecting portion being provided with a concavity in the periphery thereof and having the center of said concavity disposed on the horizontal axis of said convex connecting portion, a bolt passing through said connecting portion substantially coaxial with said horizontal axis and projecting beyond the periphery of said connecting portion, a cylindrical ring provided with a slot in the periphery thereof, said bolt passing through said slot, a threaded member in threaded engagement with the projecting end of said bolt arranged to clamp said ring to said connecting portion, and means on said ring for supporting a rod.

VINCENT MILITANO.

No references cited.